(12) United States Patent
Wheeler

(10) Patent No.: US 11,596,013 B2
(45) Date of Patent: Feb. 28, 2023

(54) WIFI QUEUEING AND CONNECTION MANAGEMENT

(71) Applicant: Waggle Corporation, Tampa, FL (US)

(72) Inventor: Glen Wheeler, Tampa, FL (US)

( * ) Notice: Subject to any disclaimer, the term of this patent is extended or adjusted under 35 U.S.C. 154(b) by 32 days.

(21) Appl. No.: 17/033,814

(22) Filed: Sep. 27, 2020

(65) Prior Publication Data

US 2022/0104291 A1 Mar. 31, 2022

(51) Int. Cl.
*H04W 76/15* (2018.01)
*H04W 76/11* (2018.01)
*H04W 84/12* (2009.01)

(52) U.S. Cl.
CPC ............ *H04W 76/15* (2018.02); *H04W 76/11* (2018.02); *H04W 84/12* (2013.01)

(58) Field of Classification Search
CPC ...... H04W 76/15; H04W 76/11; H03W 84/12
See application file for complete search history.

(56) References Cited

U.S. PATENT DOCUMENTS

| | | | | |
|---|---|---|---|---|
| 10,154,396 B1* | 12/2018 | Wheeler | ................. | H04W 4/60 |
| 10,536,832 B2* | 1/2020 | Wheeler | ............... | H04W 48/16 |
| 2014/0274136 A1* | 9/2014 | Edge | ..................... | H04W 4/30 455/456.2 |
| 2015/0088561 A1* | 3/2015 | Charles | .................. | G06Q 10/02 705/5 |
| 2015/0141005 A1* | 5/2015 | Suryavanshi | ......... | H04W 48/16 455/434 |
| 2015/0172118 A1* | 6/2015 | Lin | ..................... | H04L 41/0806 370/401 |
| 2016/0142873 A1* | 5/2016 | Trivedi | .................. | H04L 67/26 455/456.1 |

* cited by examiner

*Primary Examiner* — Mohammad S Anwar
(74) *Attorney, Agent, or Firm* — Justin Luby

(57) ABSTRACT

The present invention utilizes an application which is loaded onto the mobile devices of attendees who will be attending festivals, concerts, etc, where the large crowds attending the event will create wireless and mobile network congestion. Additionally, there is an control station which controls a wireless emitters, detectors and wireless access stations throughout the venue. The device applications and the control stations will coordinate to manage connections between the attendees device and the wireless access stations so that network congestion does not occur.

18 Claims, 9 Drawing Sheets

WIFI QUEUEING AND CONNECTION MANAGEMENT

CROSS-REFERENCE TO RELATED APPLICATIONS

Not Applicable

FIELD OF THE INVENTION

The present invention relates generally to wireless networking and more specifically to managing wireless communication between networks and mobile devices.

BACKGROUND

When a large number of wireless devices are located in close proximity to each other, congestion will occur in the networks servicing these devices, and the effectiveness of these devices to receive data will be severely impaired, limiting the functionality of these devices.

Network congestion is a common occurrence at largely attended events such as concerts and sporting events. The large number of mobile devices located in the confines of the venues for these events, coupled with the tendency of people to post pictures to social media while they are at these events, as well as live stream the events from their mobile devices, requires bandwidth which exceeds what the cellular networks can provide.

Wireless network providers have created a number of strategies to alleviate the congestion issues at these heavily attended events, such as the deployment of mobile cell sites, rapid deployment units (RDUs), cells on wheels (COWs) and cells on truck (COTs). These types of devices can help alleviate network congestion, but typically are more effective at providing functionality to lower bandwidth activities, such as texting and voice calls, than activities which require a larger amount of network bandwidth, such as updating application files. Additionally, situations exist where deployment of mobile cell sites is inadequate to support even low bandwidth activities due to signal saturation issues.

Large venues which host these types of crowded events regularly, such as stadiums, can most effectively combat this network congestion through the installation of a WI-FI network at the venue which offers an alternative method of providing wireless data to mobile devices. However, even the most sophisticated WI-FI networks at these venues will have difficulty supporting live streaming data to or from thousands of mobile devices simultaneously.

The limitation of being able to live-stream presentations to mobile devices during largely attended events such as concerts, limits the ability of the presenter to communicate all media to the viewer that he may wish to.

During concerts, there may be media, such as music videos which are synchronized to the music, which could enhance the experience for the attender. At a large venue, such as an arena or stadium, this synchronized media could be presented via large screen viewing devices such as a Jumbotron, movie screen or the like.

Todays technology would enable this type of presentation through the transmission of a VHF or UHF transmitter, if the attendees had receivers for these types of transmissions. However, the typical mobile device used today, the smartphone, does not have VHF or UHF receivers incorporated into the device. If presenters wished to utilize this technology, they would need to provide attendees with devices which could receive this type of transmission, which would be costly to procure, and would likely lead to additional costs in damaged or stolen equipment.

U.S. Pat. Nos. 10,536,832, 10,154,396 and 10,674,335 by the current inventor (Wheeler), teach a method of using WIFI transmitters and mobile devices to provide synchronized media presentations on a multitude of personal mobile devices in large crowded areas where network congestion would otherwise prevent the transmission of these presentations to the attendees, such as a concert event. However, one limitation of these patents is that they require the attendees to have the presentations loaded on their phones prior to arriving at the concert event. In-event changes to the acts or desired presentations would render the patents ineffective for their purpose. However, as discussed above, due to network congestion and/or signal saturation experienced at these events, access to a WIFI connection to update presentations on a device during the events is not feasible using existing technologies.

Thus, there exists a need for a method to allow mobile devices to receive updates to software at an event venue where typical network communications are not possible.

SUMMARY

To accomplish this objective, the method of the present invention utilizes an application which is loaded onto the mobile devices of attendees who will be attending festivals, conventions, concerts, etc, where the large crowds attending the event may not be able to use typical networking such as cellular or wireless networks. The application will be pre-configured prior to the event, assigning a unique identifier to the mobile device, which allows the event promoter to recognize the device/device owner.

Additionally, the application will be preloaded with a plurality of presentations which the presenter will utilize during the event to enhance the experience for the attendee. Each presentation will have a triggering mechanism encoded in the application which will initiate the presentation to begin and will synchronize the presentation on the device with the live presentation.

Additionally, each application will be assigned a version number. As the presenter makes changes to the application or the presentation files, an updated version number is assigned to the software.

At the event will be an "update area", where WI-FI transmitters, detectors, routers and other networking equipment may be used. During the event, attendees will activate the applications loaded on their mobile devices, and proceed to the "update area" to ensure they are using the most up-to-date version. The presenter will emit signals from at least one WI-FI transmitter located in an "update area" of the event.

In a first embodiment of the invention, transmission will include a transmitter SSID which is encoded with a set of instructions to cause the device to transmit a mobile device SSID encoded with the device unique identifier and application version through its internal WI-FI transmitter. A nearby WI-FI detector will recognize the mobile device SSID, decipher the application version from the SSID, and determine whether or not the application requires an update.

In a second embodiment of the invention, the transmission will include a transmitter SSID which is encoded with the most recent version number of the application software and a set of instructions to cause the device to check the application version currently installed on the device to the version included in the transmitter SSID. The device will then determine whether or not the application is the most recent version or if the application requires an update.

If it is determined that the mobile device application requires an update, the transmitter will transmit an SSID which is encoded with a set of instructions to cause the mobile device to transmit an SSID encoded with the mobile device unique identifier and an indication that the mobile device application requires an update. The detector will detect the mobile device SSID, decipher that the mobile device requires and update, and then queue the device for an update on the controller.

Up to this point, the WI-FI mobile devices will not actually connect to the WI-FI network. The broadcast name (SSID) of the WI-FI transmitter will include coded information including a set of instructions for the mobile device to transmit its unique identifier and application version. When the mobile devices are in range of the WI-FI transmitter, the application will decode the signal and follow the instructions. No two-way data exchange on the WI-FI network occurs, therefore, there is no network congestion issue. No network connections are established, therefore, no signal saturation issues occur.

Once the mobile device is in a queue position for an update, the controller will instruct the transmitter to emit a transmitter SSID which is encoded with the mobile device unique identifier and a set of instructions to cause the mobile device to connect with the wireless router.

The mobile device with the matching unique identifier will detect the SSID from the transmitter and execute the instructions, thereby connecting to the router. Once connected to the router, the mobile device will pull the updates from the network, disconnect from the router, and emit a mobile device SSID including its unique identifier and an instruction that the device no longer requires an update.

The detector will recognize the mobile device SSID including its unique identifier and an instruction that the mobile device no longer requires an update and will relay to the controller to remove the mobile device from the queue. Once the controller has removed the mobile device from the queue, the next mobile device in the queue will be prioritized for connection.

In a third embodiment of the invention, the promoters will group multiple mobile devices into large update families. The device application will be pre-configured with a family identifier that is assigned when the device is assigned a unique identifier. Additionally, the devices will be pre-configured with the connection information necessary to establish a connection with the router(s) in the update area(s). During the event, the promoter will instruct the transmitter to emit a transmitter SSID which is encoded with a family identifier. All the devices within the range of the transmitter that are also assigned to that family will connect to the router, update the application, exchange information and disconnect. The transmitter will periodically change the family number encoded in the SSID so that all devices eventually connect and exchange data.

Using this method, the promoter is able to limit the number of devices connected to the Wifi router, and limit the type of data exchanged with the mobile device, thereby, making data exchange via wifi manageable for a large number of devices, without bandwidth or signal saturation issues occurring.

DETAILED DESCRIPTION OF THE INVENTION

The current invention teaches a communication system and method for operating the communication system for an event promoter to manage network communication of attendees mobile devices while attending the event. The communication system comprises five primary components, Controlling Station 101, an Emitting Station 102, a Detecting Station 105, a Wireless Network Station 106, at least one Mobile Device 100, each Mobile Device with a Screen, and Application Software 104 loaded on the Mobile Device(s) 100.

Figure 1:
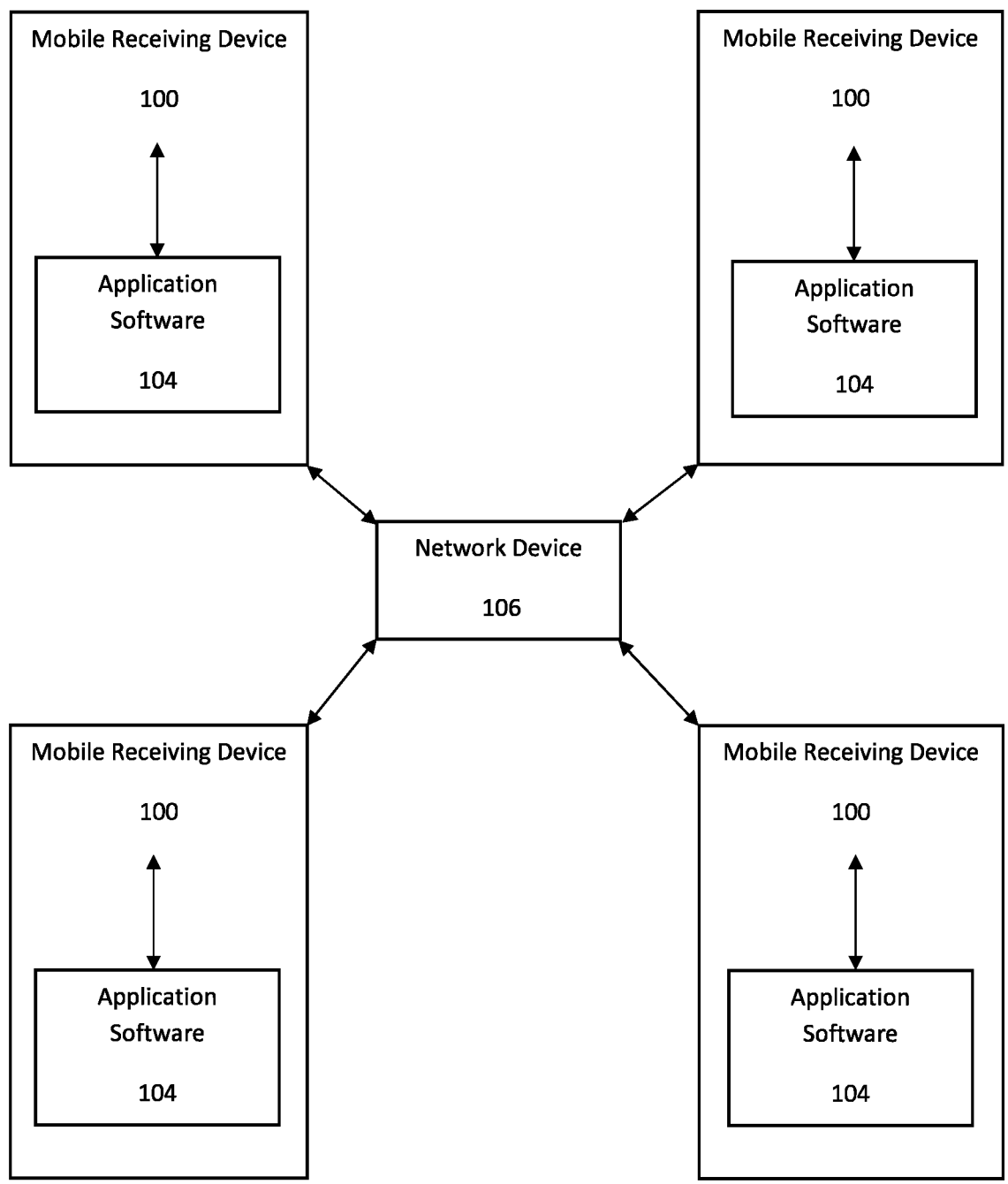
FIG. 1 illustrates a schematic of the prior art communication system, using a network to communicate between multiple mobile devices.

Referring to FIG. 1, a conventional communication system using a Mobile Device 100 transmits incoming and outgoing signals via a wireless signal from the Wireless Network Station 106 in the form of a wireless access point, requiring the Mobile Device 100 to attach to a wireless Network 103 and negotiate a common communication protocol and begin two-way communication of data. In the conventional method, the Mobile Device 100 will contain an application 104 which is loaded on the device. The Mobile Device 100 will have an application 104 loaded onto the device which is capable of decoding messages from data received from the Network 103 as well as encode messages that are transmitted via data from the Mobile Device 100 to the network. The Mobile Device 100 is required to maintain two way communication with the Wireless Network Station 106 in order to send and transmit data.

Using the prior art, the Application 104 loaded on the Mobile Device 100 can merely decode data received into viewable form on the device, and the data is not required to be stored on the device. This method of Data Transfer minimalizes the amount of data which needs to be stored on the Mobile Device 100 to view the presentation, conserving storage on the Mobile Device 100.

When using the communication method patented in U.S. Pat. Nos. 10,536,832, 10,154,396 and 10,674,335, presentation files are uploaded to the Application 104 prior to arriving at the event, increasing the amount of data necessary to be stored on the phone. A challenge occurs when using this presentation method when the presentation files are updated after the attendee has arrived at the event.

Transferring the data necessary to update presentation files on tens of thousands of event attendees Mobile Devices 100 simultaneously using two-way communication is not feasible using the technology today, including Wi-Fi, Cellular Networks, and short-wavelength UHF radio waves. These networks have bandwidth limitations which cannot support two-way communications with tens of thousands of devices simultaneously in a confined area. The primary limitation of the conventional communication systems of FIG. 1, is that a wireless access point can only have a finite number of Mobile Devices 100 connected to the wireless access point at a given time, which limits the effectiveness of this type of communication in a confined area with a large number of users attempting to connect to the communication system simultaneously.

Figure 2:
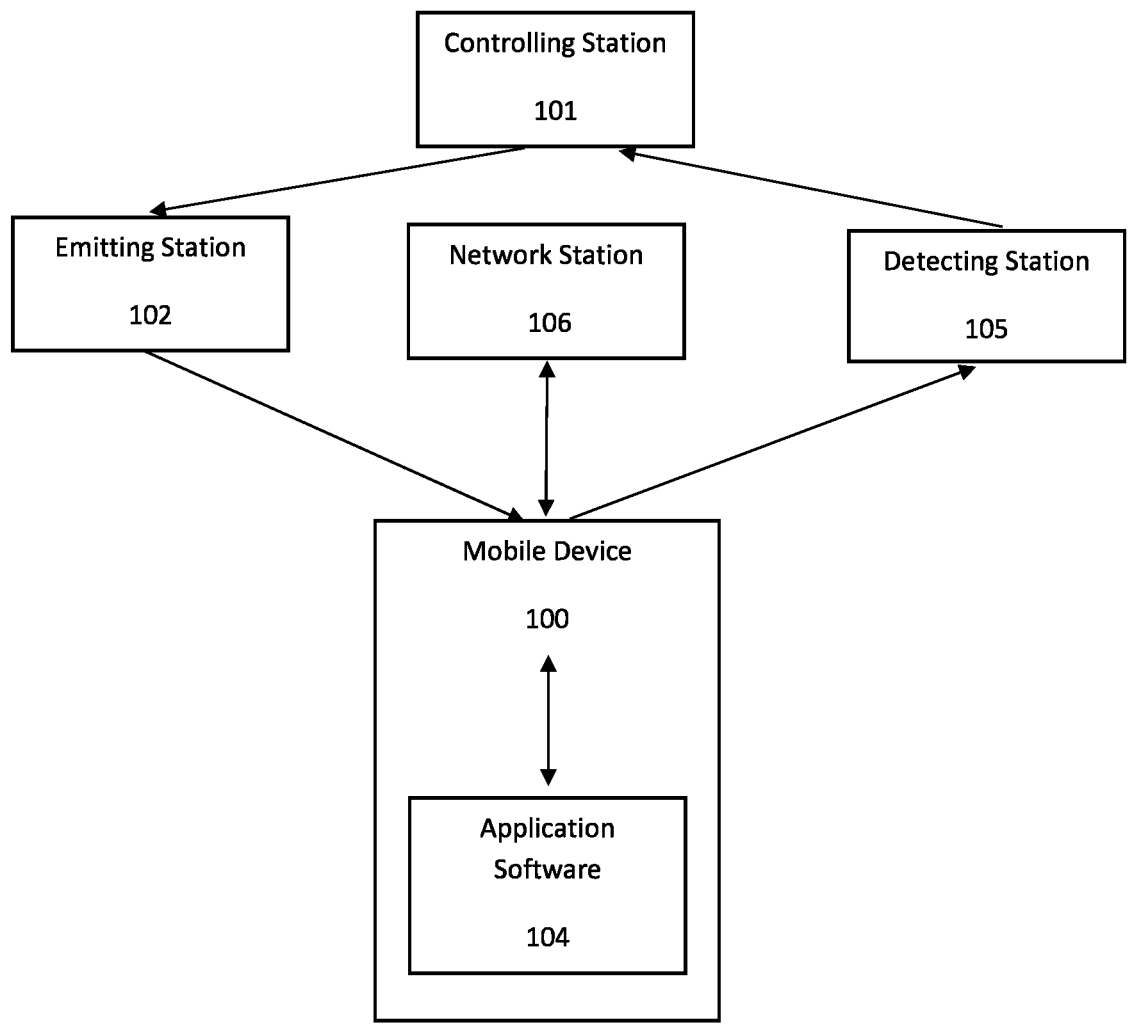
FIG. 2 illustrates a schematic of the first and second embodiments of the communication system utilizing an emitter, a detector, mobile device transmitter, router, and controller to manage mobile device data exchange.

Referring to FIG. 2, the communication system and method of the current invention provides a method for managing two-way communication between Mobile Devices 100 and a Wireless Network Station 106. The two-way communication between the Mobile Devices 100 and a Wireless Network Station 106 is primarily intended for updates to the Applications 104 on the Mobile Devices 100. However, the communication system and method can be utilized for other uses, including, but not limited to the Mobile Devices 100 uploading data to a server as well.

This new method works around the limitation that a Wireless Network Station 106 can only have a finite number of Mobile Devices 100 connected to the Wireless Network Station 106 at a given time. This communication system and method creates a queueing system using a Controlling Station 101, an Emitting Station 102, and a Detecting Station 105 for connecting and disconnecting Mobile Devices 100 that manages Wireless Network Station 106 connections, allowing the Wireless Network Station 106 to be used efficiently, only for Application 104 updates. Because the queuing communication system is one-way and not two-way, there is no limitation on the network for the number of devices it can support.

In the preferred embodiment the Mobile Device 100 is any device that is capable of recognizing communication networks, capable of emitting a WIFI signal, and is capable of running the corresponding application software. Examples of technologies which could be utilized as a Mobile Device 100 for the communication system of the present invention include, but are not limited to, mobile devices, such as a cell phone or tablet, or computers, both laptops and desktops, which can run the corresponding application software.

Most modern versions of all of the mentioned Mobile Devices 100 have internal WI-FI antennas which allow them not only to receive a WI-FI signal from and emitting station, but also transmit a WI-FI signal, which allows the Mobile Device 100 to send data in a WI-FI network. The Mobile Device 100 internal WI-FI antennas also allow the devices to serve as mobile "hotspots" which creates a secondary network which other devices can connect to. They can then transmit data over the Mobile Device 100 which then re-transmits the data to the Wireless Network Station 106. In order for the Mobile Device 100 to create a connectable hotspot, the Mobile Device 100 must also emit an SSID to be discovered. This SSID can be changed by the Mobile Device 100 user, or applications loaded on the Mobile Device 100. The Mobile Device 100 may have the ability to modulate the strength of the WI-FI signal it emits, allowing it to control the range of the SSID transmission around the device.

In the preferred embodiment, the Emitting Station(s) 102 is a device capable of emitting an IEEE 802.11x (Wi-Fi) signal and running specialized software written specifically for the purposes described in this patent application. Wireless access points typically emit an identifier called a Service Set Identifier (SSID) which can be read by other Wi-Fi enabled devices. This system converts traditional Wireless Access Points and SSIDs for use as Emitting Stations 102. The corresponding software allows the Emitting Station 102 to accept commands from a Controlling Station 101 (over traditional communication methods). The Controlling Station 101 sends commands which will cause the Emitting Station 102 to change its SSID as directed.

In the preferred embodiment the Detecting Station(s) 105 is a device capable of recognizing a Mobile Device 100 Wi-Fi signal and running specialized software written specifically for the purposes described in this patent application. The Detecting Station 105 could be a stand-alone device, or could also be integrated into the same device as the Emitting Station 102 and/or Wireless Network Station 106.

In the preferred embodiment, the Wireless Network Station(s) 106 is a networking device that forwards data packets between the Network 103 and the Mobile Device 100. In order to streamline the update process and provide access to the maximum number of attendees, for the proposes of ensuring that the Mobile Devices 100 have the most recent versions of the presentation files on the devices, the data packets primarily include Application 104 updates to the presentation files. In the preferred embodiment, the Wireless Network Station is a IEEE 802.11x (Wi-Fi) capable wireless router. The Wireless Networking Station 106 could be a stand-alone device, or could also be integrated into the same device as the Emitting Station 102 and/or Detecting Station 105.

While the Wireless Network Station 106 in the preferred embodiment of the current invention is a wireless Wi-Fi router, the inventor recognizes that there are a number of Wireless Access Point Devices which are capable of wirelessly transmitting data packets. Examples of other technologies which could be utilized as a Wireless Network Station 106 for the communication system of the present invention include, but are not limited to, Cellular Networks and Bluetooth. Additionally, the inventor recognizes that technology surrounding wireless communication is constantly evolving, and intends that this communication system could be adapted to work with developing technology which is capable of wirelessly transferring data to a wireless device.

The Controlling Station 101 is any device capable of sending instructions that are interpreted by an Emitting Station 102 and receiving instructions from a Detecting Station 105. The Controlling Station 101 instructs the Emitting Station 102 to change its SSID to a specified name on demand. The Controlling Station 101 is made up of software designed to encode data and commands into an SSID that will be transmitted through the Emitting Station 102 and recognized and decoded by the desired Mobile Device 100 in a specific place at a specific time.

In traditional network communications, the user of the IEEE 802.11x (Wi-Fi) capable device must indicate a named network to join so that the device can begin negotiating with the network for a connection before communications can begin. The mobile device update queueing system of the current invention requires only the detection of the SSID by the Mobile Device 100. There is no need for the Mobile Device 100 to attach to the Emitting Station 102, Detecting Station 105, or to any network device for the device to be queued for an update. Unlike a traditional Wi-Fi connection, the Emitting Station 102 does not need to determine if any Mobile Devices 100 are listening or not.

The number of Mobile Devices 100 that can be entered into the Controlling Station 101 queue is limited only by the number of devices that can be physically located within the broadcasting range of the Emitting Station 102. The Controlling Station 101 queue maintains a list of all the devices which wish to connect to the Wireless Network Station 106 and manages the number of devices that are concurrently connected to the Network 103 through the Wireless Network Station 106. This will limit the number of Mobile Devices 100 attached to the Network 103 to an optimal efficiency. Additionally, the Network 103 can have limited functionality, ensuring the Network 103 usage is limited to the intended purpose and not general purpose uses such as internet browsing.

This is a significant advantage over existing network models which are hampered by the number of simultaneous Wi-Fi connections that they can support. Each connection to a traditional Wi-Fi network degrades the performance of the network for all other connected devices. For example, most industrial grade Wi-Fi routers can support a maximum of two hundred and fifty simultaneously connected devices. Bandwidth limitations on a Wi-Fi router would make supporting that many connections impractical. Since this new method repurposes the Wi-Fi router as a broadcaster only, the same Wi-Fi router, when used as an Emitting Station 102, can manipulate thousands of devices at once with no degradation in performance.

The Emitting Station 102 can broadcast instructions to any Mobile Device 100 within range. The Mobile Device scans the available detected SSIDs for a pattern match. Once a match is detected, the entirety of the SSID is deciphered by the application software. The SSID name can contain data and instructions that are understood by the Mobile Device 100.

Event promoters make the Application Software 104 available for download to attendees in advance of the event. Prior to arriving at the event venue, attendees will download and install Application Software 104 on their Mobile Devices 100. The Application Software 104 includes a unique Mobile Device 100 SSID for each device that identifies the device and device owner to the promoters.

At the event the Controlling Station 101 could send a software command via a traditional local area network (LAN) to an Emitting Station 102. The Emitting Station 102 would interpret the command and change its SSID as instructed.

Part of the SSID name is used by the Mobile Device 100 to establish a pattern match. For example, the Application Software 104 loaded on the Mobile Device 100 could be programmed to look for SSID's that begin with "MMSCOMMAND" or any other predetermined string. The Mobile Device 100 would ignore all SSID's that don't begin with the predetermined string.

The remaining SSID characters are then deciphered by the Mobile Device 100. The characters can be interpreted by the Application Software to execute functions and inject data. In a first embodiment, "MMSCOMMANDUNIDVER" could be broken down as "MMSCOMMAND", and "UNID". "MMSCOMMAND" could cause the Application Software 104 to read the SSID and decipher the remaining characters. "UNID" could be interpreted by the Mobile Device 100 as "transmit WIFI unique identifier". "VER" could be interpreted by the Mobile Device 100 as "transmit Application Version". The Mobile Device 100 will then transmit the unique identifier assigned to that device and the Application Software 104 version as an encoded SSID (e.x. 5555_Ver2.2).

Detecting Stations 105 in range of the Mobile Device 100 emitting the SSID 5555_Ver2.2 would detect the SSID and transmit an instruction to the Controlling Station 101 that the device is in range of the Detecting Station 105.

Figure 3:
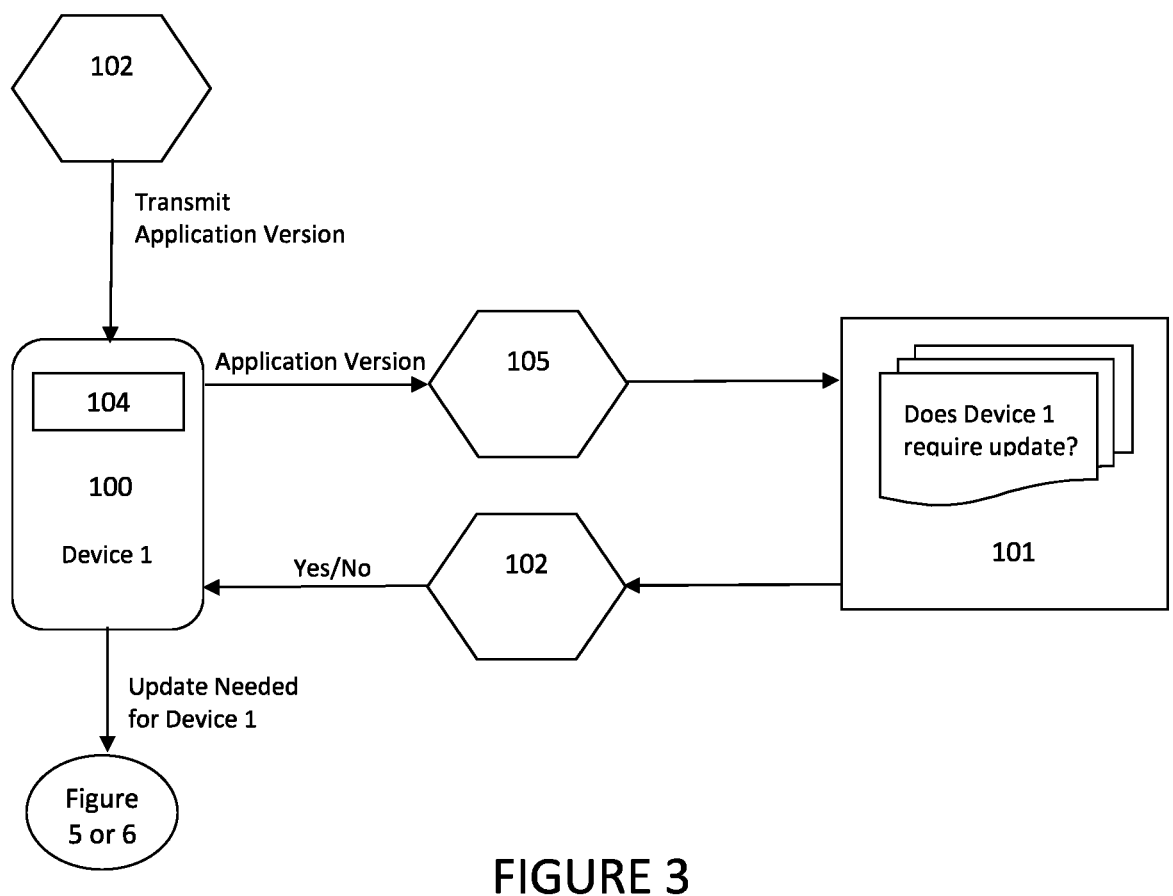
FIG. 3 illustrates a flow chart of a first embodiment of the communication system utilizing an emitter, a detector, mobile device transmitter, router, and controller to determine if mobile device updates are required.

Referring to FIG. 3, in a first embodiment of the invention, the Emitting Station 102 is utilized to send a communication to a Mobile Device 100, such as an instruction to execute a particular operation, such as setting its SSID to transmit the Mobile Device 100 unique identifier and the Application 104 version. Using this method, the Controlling Station 101 can identify the Application 104 version of the attendees Mobile Device 100 by the encoded SSID's that are detected by the Detecting Stations 105. This method allows for the Controlling Stations 101 to determine which devices require updates without requiring the device to connect with a Wireless Network Station 106. Once the Controlling Station 101 has identified the Application 104 version loaded on the Mobile Device 100, the Controlling Station 101 can assess whether or not the device requires an update.

Once the Controlling Station 101 has assessed whether the Mobile Device 100 Application 104 requires an update, the Controlling Station 101 will transmit the results of the assessment via the Emitting Station 102 using an encoded SSID such as "MMSCOMMAND5555UPDATE(Y)" or "MMSCOMMAND5555UPDATE(N)," where MMSCOMMAND is the SSID string starter the Mobile Device 100 is looking for, "5555" is the Mobile Device 100 unique identifier, and "UPDATE(Y)" indicates that an update is required and "UPDATE(N)" indicates the Application 104 is up to date.

Figure 4:
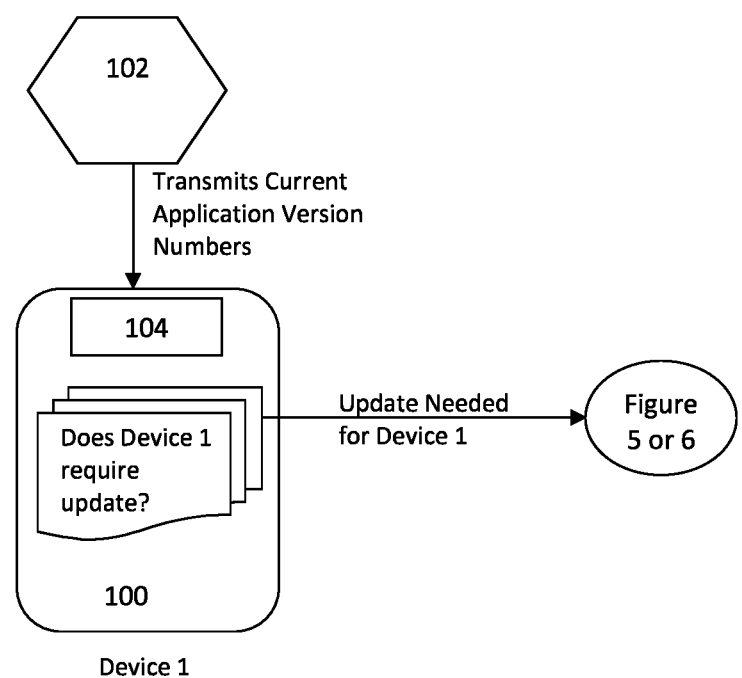
FIG. 4 illustrates a flow chart of a second embodiment of the communication system utilizing only an emitter and a mobile device to determine if mobile updates are needed.

Referring to FIG. 4, in a second embodiment of the current invention, the Emitting Station 102 is utilized to transmit an instruction which includes the current Application 104 version number(s). The Mobile Device 100 detects and compares the broadcast Application 104 version numbers to its internal Application 104 version numbers to determine if an update is needed. This method allows for the Mobile Device 100 itself to determine if Application 104 updates are needed without requiring the Mobile Device 100 to broadcast any SSID.

Figure 5:
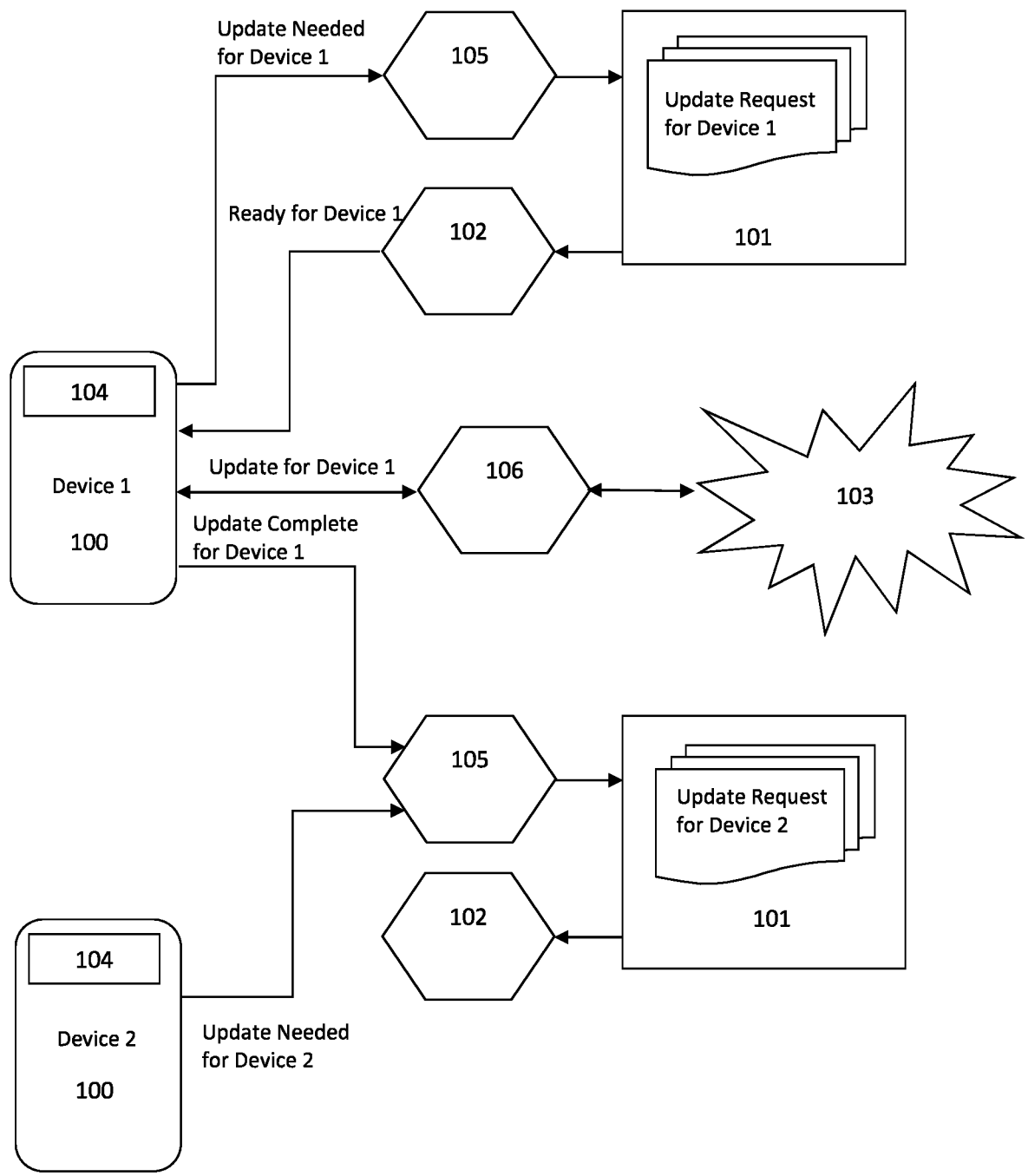
FIG. 5 illustrates a flow chart of the communication system utilizing an emitter, a detector, mobile device transmitter, router, and controller to manage mobile device updates.

Referring to FIG. 5, when a Mobile Device 100 is determined to need an update, The Mobile Device 100 will then transmit its unique identifier assigned to that device and an indicator that the Application Software 104 version requires updating as an encoded SSID (e.x. 5555_UPDATE) which will be detected and decoded by the Detecting Stations 105. Additionally, the Application Software 104 will alert the attendee that the Mobile Device 100 requires an update on the Mobile Device 100 screen.

The Detecting Stations 105 will relay all the SSIDs detected to the Controlling Station 101, which will recognize which Mobile Devices 100 require updating and will create a SSID queue of devices which require Application Software 104. As discussed above, a Wireless Network Station 106 is limited to the number of Mobile Devices 100 which can effectively utilize the Wireless Network Station 106 concurrently. The Controlling Station 101 will manage the queue of Mobile Devices 100 which require updates, and allow a limited number of Mobile Devices 100 to be connected to the Wireless Network Station 106, so that the number of Mobile Devices 100 concurrently connected to and updating on the Wireless Network Station 106 does not exceed the capacity of the Wireless Network Station 106.

Figure 6:
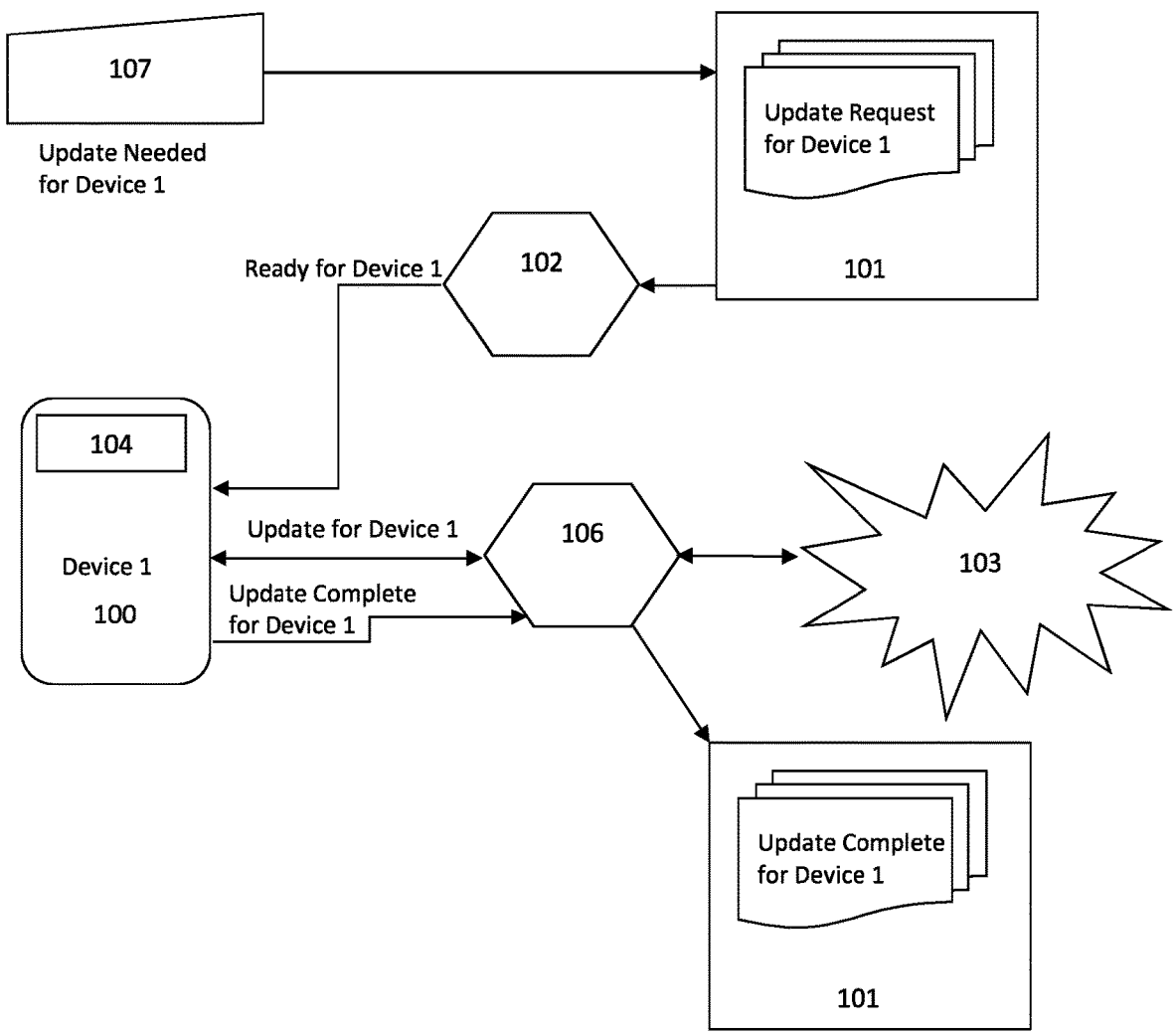
FIG. 6 illustrates a flow chart of an alternate embodiment of the communication system utilizing an entry screen, an emitter, router, and controller to manage mobile device updates.

Referring to FIG. 6, in an alternate embodiment of the invention the Application Software 104 will alert the attendee that the Mobile Device 100 requires an update on the Mobile Device 100 screen. The alert will include an unique device ID number. The attendee will then visit an Entry Station 107 located in the update area. A data entry screen is present at the Entry Station 107. The attendee will manually enter the unique device ID number into the entry Station 107 data entry screen. The Controller 101 will add the Mobile Device 100 to the update queue. Once an update slot is available, the Controller 101 will instruct the Emitting Station 102 to broadcast an instruction telling the Mobile Device 100 to connect to a nearby Wireless Network Station 106 and update its Application Software 104. The Mobile Device 100 will notify the Controller 101 via the Wireless Network Station 106 once the updates are complete. The Mobile Device 100 will then disconnect from the Wireless Network Station 106.

When the Controlling Station 101 wants to allow a device to connect to the Wireless Network Station 106, the Controlling Station 101 will instruct the Emitting Station 102 to emit an SSID which includes the unique identifier of the Mobile Device 100 and an instruction to the Mobile Device 100 that includes a passcode to attach to the Wireless Network Station 106, such as "MMSCOMMAND5555SSIDWGL5PWOPENSESAME," where MMSCOMMAND is the SSID string starter the Mobile Device 100 is looking for, "5555" is the Mobile Device 100 unique identifier, and "SSIDWGL5" is the wireless router SSID to attach to and "PWOpenSesame" is the password for the Mobile Device 100 to use to connect to the router. The Controlling Station 101 will then change the status of the Mobile Device 100 from queue status to update in process. The mobile device will change its SSID from one indicating that an update is needed, to one that indicates an update is in process.

Alternatively, instead of providing the wireless router SSID and password for the Mobile Device 100 to use to connect to the router in the SSID transmitted by the Emitting Station 102, the Application 104 could be preloaded a table of the the Wireless Network Station(s) 106 SSIDs and passwords, and the command could simply be "MMSCOMMAND5555SSCONNECT15," where MMSCOMMAND is the SSID string starter the Mobile Device 100 is looking for, "5555" is the Mobile Device 100 unique identifier, and "CONNECT" is the instruction to connect to the Wireless Network Station 106, and "15" lets the application know that the Network Station 106 SSID and password is located at table row 15.

Once the Mobile Device 100 and Wireless Network Station 106 are connected, the Mobile Device will pull the updates from the Network 103, through the Wireless Network Station 106. In the preferred embodiment, the Application Software 104 will limit the functionality of the network connection to only the desired purpose from the Network 103, to limit unnecessary traffic, such as Attendees browsing the internet.

Once the Application Software 104 updates are complete, the Application Software 104 may instruct the Mobile Device 100 to change its SSID to an encoded SSID that includes the unique identifier and an indicator that the update is complete (e.x. 5555_UPDATECOMPLETE) which will be detected and decoded by the Detecting Stations 105. The Mobile Device 100 will also terminate the connection to the Wireless Network Station 106.

The Detecting Station 105 will recognize the Mobile Device 100 SSID including its unique identifier and an instruction that the device no longer requires an update (e.x. 5555_UPDATECOMPLETE) and relay to the Controlling Station 101 to remove the Mobile Device 100 from the update in process status. Once the Controlling Station 101 has removed Mobile Device 100 from the update in process, the next Mobile Device 100 in the queue will be prioritized for update, using the method detailed above.

Figure 7:
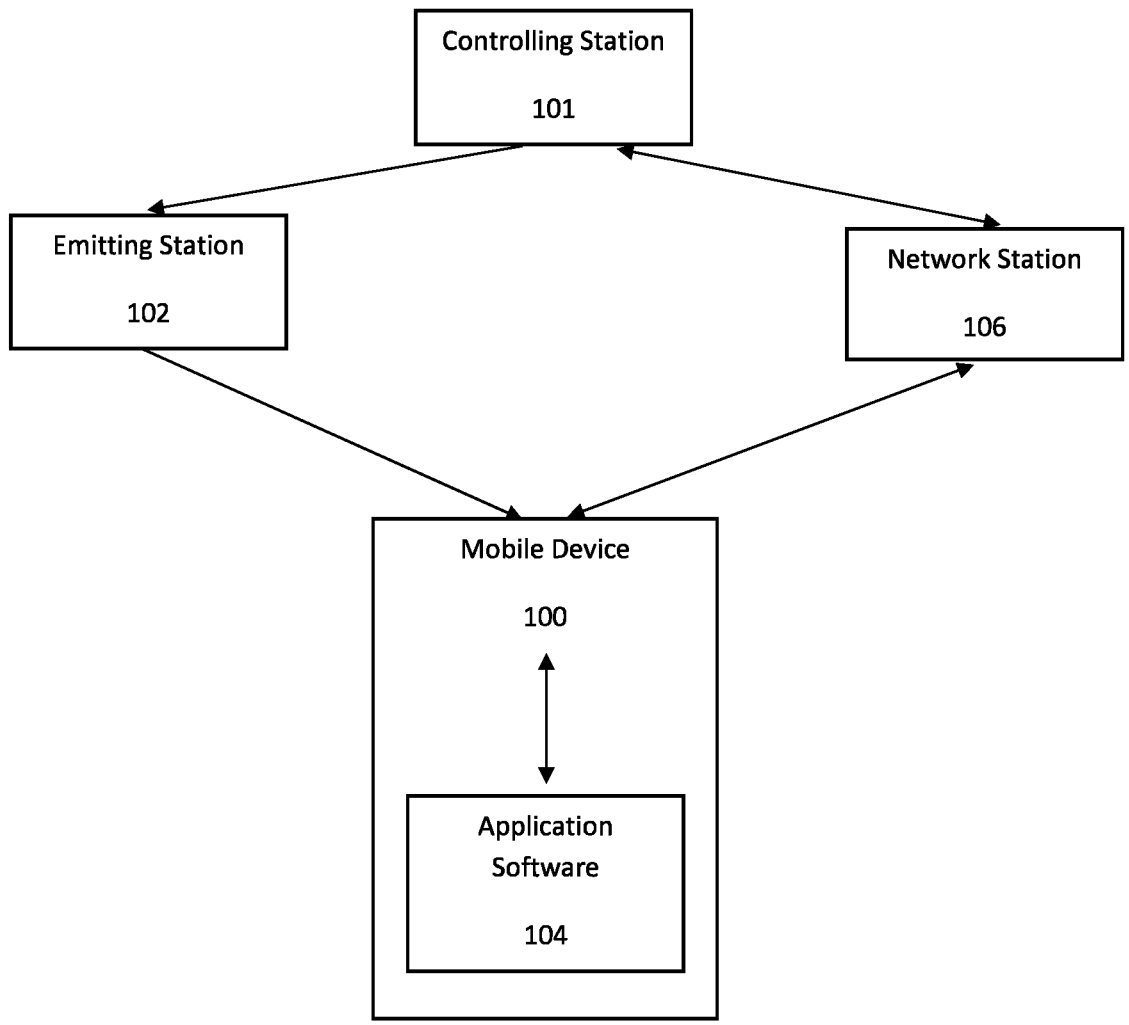
FIG. 7 illustrates a schematic of the first and second embodiments of the communication system utilizing an emitter, a detector, mobile device transmitter, router, and controller to manage mobile device data exchange.
Figure 8:
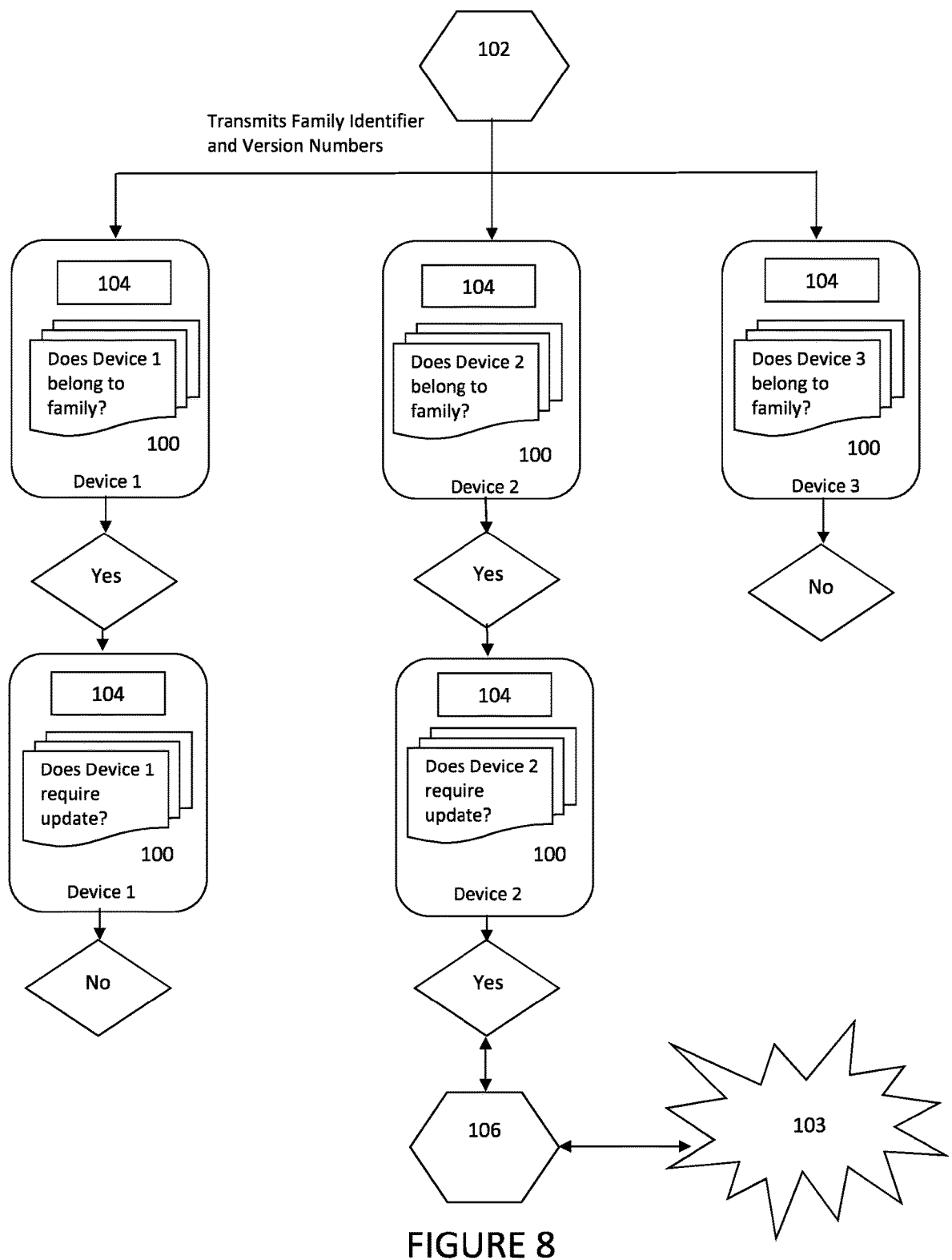
FIG. 8 illustrates a flow chart of the third embodiment of communication system utilizing an emitter, mobile device, router, and controller to manage mobile device updates in families of devices.

FIGS. 7 & 8 refer to a third embodiment of the communication system and method, where two way communication updates between Mobile Device(s) 100 and Wireless Network Station 106 are managed for Application 104 updates and other communications. When utilizing this embodiment, the Application Software 104 includes a group family designation. Mobile Device(s) 100 are randomly assigned a family designation. The number of families is predetermined by the event organizers to maximize efficiency.

Family designations can group thousands of Mobile Device(s) 100 into tens or hundreds of families. By grouping Mobile Device(s) 100 into families and only inviting a particular family to connect to a Wireless Network Station 106 for data exchange at a given time, the promoters can connect with a manageable number of Mobile Device(s) 100. For example, at an event where 70,000 attendee Mobile Device(s) 100 are expected and the event venue can only support up to 1,000 active wi-fi connections simultaneously to the Wireless Network Station(s) 106. If all 70,000 attendee Mobile Device(s) 100 tried to connect to the Wireless Network Station(s) 106 at once, the system would fail completely and zero connections would be successful. Using this method, for an event with a crowd size of 70,000 attendees that can only support 1,000 active wi-fi connections the promoters may create 70 families of approximately 1,000 members each.

Referring to FIG. 7, in a second embodiment of the current invention, the Controlling Station 101 instructs the Emitting Station 102 to broadcast an SSID with an encoded instruction that includes the family designation and instructs the members of that family designation to connect to the Wireless Network Station 106.

Referring to FIG. 8, in one example the Emitting Station 102 is utilized to transmit an instruction which includes the family designation and current Application 104 version number(s) (e.x. FAM23_VER5.2). The Mobile Device 100 detects the transmission and determines if the Mobile Device 100 is in the relevant family. If the Mobile Device 100 is in the relevant family, the device will and compare the transmitted Application 104 version numbers to its internal Application 104 version numbers to determine if an update is needed. If an update is required, the Mobile Device 100 will establish a connection to the Wireless Network Station 106 using one of the methods previously disclosed above, update the Application 104 and disconnect. Using this connection method allows the device to further limit the number of Mobile Devices 100 simultaneously connecting to the Wireless Network Station 106, not only to all those in the family, but also only those requiring an Application 104 update.

The connection limitation of requiring a Mobile Device 100 to be both a member of the family, and utilizing an out-of-date application could be reduced to simply requiring the Mobile Device 100 to be a member of the applicable family to establish a connection to the Wireless Network Station 106. Eliminating this limitation would allow for more functionality of the communication system, such as uploading data from the Mobile Device 100 to a server through the Wireless Network Station 106. However, this could also limit performance of the communication system. In this example, the Emitting Station 102 is utilized to transmit an instruction in the form of an encoded SSID instruction. For example, "FAM23_REPORTDATA" could decode to mean "All Mobile Devices 100 in Family 23 must connect to the Wireless Network Station 106 and upload any unreported data". All Mobile Devices 100 within range will detect and decode the instruction. Mobile Devices 100 that belong to Family 23 and have unreported data will connect to the Wireless Network Station 106 and send their data to a central server. The Mobile Devices 100 will then disconnect from the Wireless Network Station 106.

At a specified time interval, for example once a minute, the Controlling Station 100 will replace its instruction to the Emitting Station 102 with a new one for a new device family. The new instruction may be delayed by the Controlling Station 100 if too many devices are still connected and transmitting data through the Wireless Network Station 106. Once the time has elapsed and the Controlling Station 100 determines that the number of connections is below the threshold, the new instruction will be broadcast on the Emitting Station 102.

This method allows the large pool of Mobile Devices 100 to be segmented into manageable groups and allows a Wireless Network Station 106 to service a select group of devices when it would otherwise be overwhelmed with connection requests. In this example, a network communication system capable of only handling 1,000 simultaneous connections could provide service to all 70,000 Mobile Devices 100 over a 70 minute period.

Figure 9:
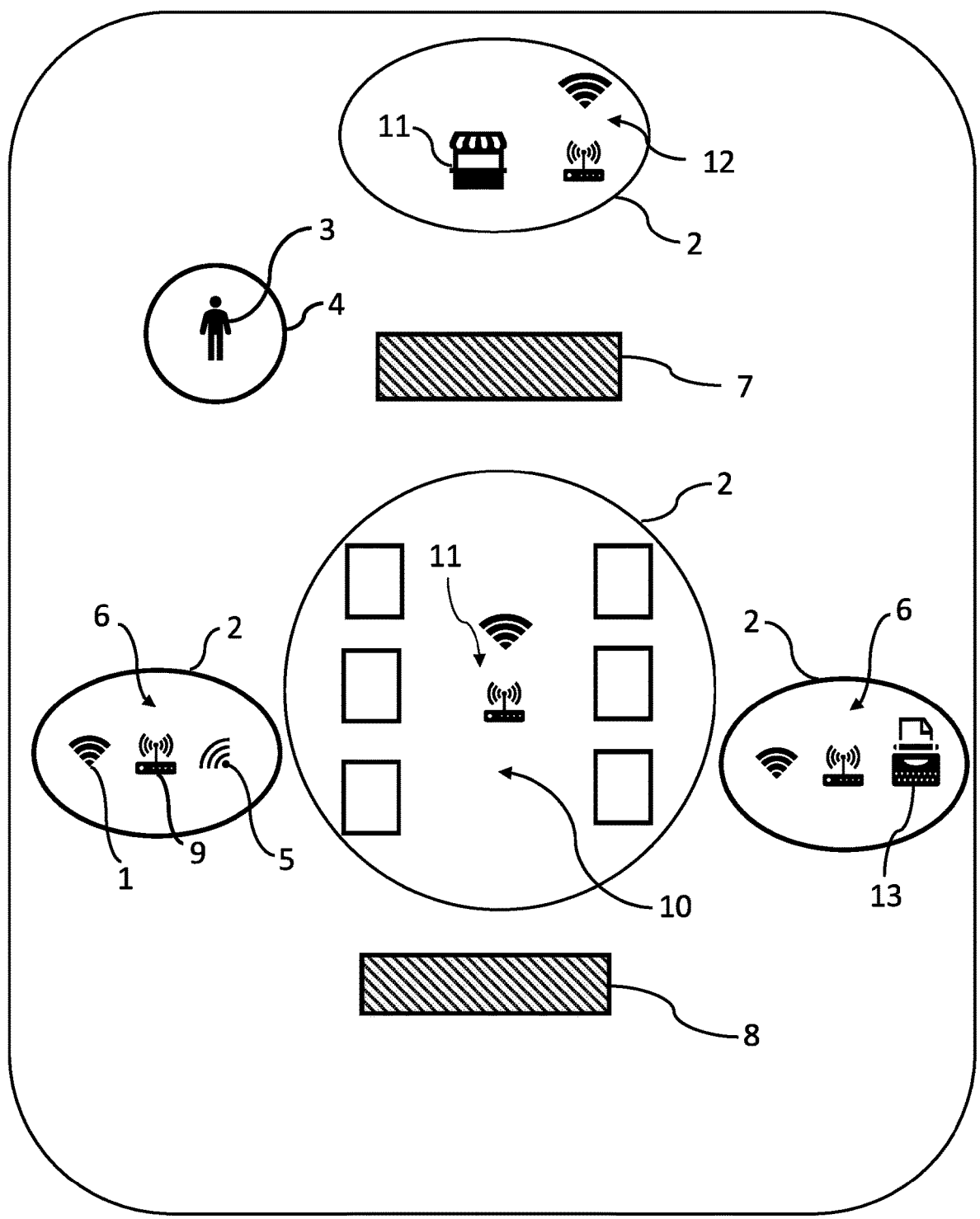
FIG. 9 illustrates an arrangement of a festival concert, and how the update stations could be arranged to successfully operate the communication system of the current invention.

FIG. 9 depicts an example of how the communication system of the current invention could be utilized at an event venue. The event venue of this example will have two stages, Stage A 7 and stage B 8, Vendor Booth and Concession Area 10, and Entrance 11. Single Device Queueing Stations 6 are located throughout the venue comprise Emitting stations 1 which emit a signal 2, Detecting stations 5 and or Entry stations 13, and Wireless Network Stations 9. Family Update stations 12 are also located throughout the venue comprise Emitting stations 1 which emit a signal 2, and Wireless Network Stations 9.

Attendee 3 arrives at the event, activates the Application Software on her Mobile Phone and proceeds to Stage A 7. Due to the vast number of attendees present at the event, Attendee's 3 Mobile Device cannot communicate with her cellular network.

While Attendee 3 is waiting in line at the Entrance 11 or visiting the Vendor Booth and Concession Area 10, Family Update stations 12 are operating in the background, cycling through the different Families of update groups. If the Attendee 3 is located in the range 2 of the Family Update stations 12 when Attendees 3 Family actively being transmitted by the Emitting Station 1, the Application Software will be updated automatically.

While Attendee 3 is at the venue, the Attendee 3 can proactively ensure she has the most up to date software for the event by visiting a Single Device Queueing Station 6. When the Attendee 3 enters the Single Device Queueing Station 6 the Mobile Phone will enter into the range 2 of the emitting station 1. The emitting station 1 is emitting an encoded SSID 2 with an instruction to the personal Mobile Devices to start emitting an SSID 4 with unique identifier and Application Software version. The range of the Attendee's 3 personal device SSID 3 will reach the detecting station(s) 5, and her unique SSID will be transmitted to the Controlling Station and analyzed to ensure the proper version is loaded. If the Application Software requires an update, the Controlling Station, will utilize the emitting station 1 to emit an encoded SSID 2 with an instruction for the personal Mobile Devices to connect to the Wireless Network Station 9 and complete the updates. The Attendee 3 will remain in range of the Wireless Network Station 9 until the update is complete, at which point the Mobile Device will disconnect from the Wireless Network Station 9.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of managing connections between mobile devices and wireless network access devices comprising:

providing said mobile devices, said mobile devices having a unique identifier, being capable of detecting an emitting station wireless network signal over a range of area, and emitting a mobile device wireless network signal with an encoded mobile device network identifier, said mobile devices also comprising an application loaded on the mobile devices;

providing at least one emitting station transmitting the emitting station wireless network signal with an encoded emitting station network identifier over the range of area, said emitting station wireless network signal not allowing the mobile devices to connect to the emitting station wireless network signal;

providing at least one detecting station which is capable of detecting the mobile device wireless network signal emitted from the mobile devices and relaying the encoded mobile device network identifier to a controlling station;

providing a wireless network access device that has a capacity to establish connections with a limited number of concurrent connections between the mobile devices and a network;

providing the controlling station that is capable of instructing the emitting station to transmit the encoded emitting station network identifier, is capable of receiving relayed mobile device network identifiers from detecting stations, and is capable of maintaining a list of a mobile device wish to establish a connection to the wireless network access device;

the mobile devices each emitting the mobile device wireless network signal encoded with the mobile device network identifier and a first instruction that the mobile device wish to establish the connection with the wireless network access device;

the detecting station detecting the mobile device wireless network signal encoded with the encoded mobile device network identifier and the instruction that the mobile device wishes to establish the connection with the wireless network access device and relaying the encoded mobile device network identifier to the controlling station;

the controlling station maintaining a queue list of the relayed mobile device unique identifiers that wish to establish the connection with the wireless network access device;

the controlling station instructing the emitting station to transmit encoded emitting station network identifiers encoded with a number of mobile device unique identifiers, instructing the mobile devices to connect to the wireless network access device, the number of mobile device unique identifiers being less than a capacity of the wireless network access device;

said mobile devices detecting the encoded emitting station network identifier, but not establishing the connection to the emitting station wireless network signal, when the mobile devices are located in the range of the emitting stations;

said application loaded on the mobile devices recognizing the emitting station wireless network signal, decoding the instructions encoded in the emitting station network identifier and executing the instruction to connect to the wireless network access device, execute a data exchange with the wireless network access device, and disconnect from the wireless network access device once the data exchange is complete.

2. The method of managing connections between mobile devices and wireless network access devices of claim 1, further comprising a step of the controlling station removing the encoded mobile device network identifier from the queue list once the emitting station has transmitted the encoded mobile device network identifier.

3. The method of managing connections between mobile devices and wireless network access devices of claim 1 further comprising steps of:

after the data exchanges are complete and the mobile device has disconnected from the wireless network access device, the mobile device will emit the mobile device wireless network signal with the encoded mobile device network identifier and a second instruction that the mobile device has disconnected from the wireless network access device;

the detecting stations detecting the mobile device wireless network signal with the encoded mobile device network identifier and a third instruction that the mobile device has disconnected from the wireless network access device and relaying the encoded mobile device identifier to the controlling station;

the controlling station removing the mobile device from the queue list, identifying a new mobile device to connect to the wireless network access device, and instructing the emitting station to transmit encoded emitting station network identifiers encoded with a new encoded mobile device identifier instructing the new mobile device to connect to the wireless network access device.

4. The method of managing connections between mobile devices and wireless network access devices of claim 1 wherein the encoded emitting station network identifier emitted further comprises a set service identifier and a password for the wireless network access device.

5. The method of managing connections between mobile devices and wireless network access devices of claim 1 wherein the application further comprises a preloaded set of service identifiers and passwords for the wireless network access devices and the encoded emitting station network identifiers emitted further comprise a fourth instruction to identify an appropriate service identifier and the password to the wireless network access device from the preloaded set of service identifiers and passwords in the application.

6. A method of managing connections between mobile devices and wireless network access devices comprising:

providing said mobile devices, said mobile devices having a mobile device network identifiers, being capable of detecting an emitting station wireless network signal over a range of area, said mobile devices also comprising an application loaded on the mobile devices;

providing at least one emitting station which transmits the emitting station wireless network signal over the range of area identified with a network identifier, said network signal functionality being limited to transmitting an encoded network identifier and said network signal not allowing mobile devices to connect to the emitting station wireless network signal;

providing at least one entry station which is capable of allowing event attendees to manually enter their mobile device network identifier into the entry station and relaying the mobile device network identifier to a controlling station;

providing a wireless network access device that has a capacity to establish connections with a limited number of concurrent connections between the mobile devices and a network;

providing the controlling station that is capable of instructing the emitting station to transmit the encoded network identifier, is capable of receiving relayed mobile device network identifiers from data entry stations, and is capable of maintaining a list of mobile devices that want to connect to the wireless network access device;

the controlling station maintaining a queue list of the relayed mobile device network identifiers that wish to establish a connection with the wireless network access device;

the controlling station instructing the emitting station to transmit the encoded network identifiers encoded with a number of mobile device network identifiers, instructing the mobile devices to connect to the wireless network access device, the number of mobile device network identifiers being less than the capacity of the wireless network access device;

said mobile devices detecting the encoded emitting station network identifier, but not establishing the connection to the emitting station wireless network signal, when the mobile devices are located in the range of the emitting stations;

said application loaded on the mobile devices recognizing the emitting station wireless network signal, decoding the instructions encoded in the emitting station network identifier and executing the instruction to connect to the wireless network access device, execute a data exchange with the wireless access device, and disconnect from the wireless network access device once the exchange with the wireless access device is complete.

7. The method of managing connections between mobile devices and wireless network access devices of claim 6, further comprising a step of the controlling station removing an individual mobile device unique identifier from the queue list once the emitting station has transmitted the individual-mobile device unique identifier in the encoded emitting station network identifiers.

8. The method of managing connections between mobile devices and wireless network access devices of claim 6 further comprising steps of:
providing said controlling station which is capable of detecting the mobile devices when the mobile devices are connected to the wireless network access device;
the controlling station detecting that the mobile devices have disconnected from the wireless network access device;
the controlling station removing an individual mobile device from the queue list, identifying a new mobile device to connect to the wireless network access device, and instructing the emitting station to transmit encoded emitting station network identifiers encoded with a new mobile device network identifier instructing the new mobile device to connect to the wireless network access device.

9. The method of managing connections between mobile devices and wireless network access devices of claim 6 wherein the encoded emitting station network identifiers emitted further comprise a set service identifier and a password for the wireless network access device.

10. The method of managing connections between mobile devices and wireless network access devices of claim 6 wherein the application further comprises a preloaded set of service identifiers and passwords for the wireless network access devices and the encoded emitting station network identifiers emitted further comprise an instruction to identify an appropriate service identifier and password to the wireless network access device from the preloaded set of service identifiers and passwords in the application.

11. A method of managing connections between mobile devices and wireless network access devices comprising:
providing the mobile devices at an event, said mobile devices each being assigned a unique identifier and family identifier, being capable of detecting a wireless network signal over a range of area, said mobile devices also comprising an application loaded on the mobile devices;
said family identifier being assigned to a number of the plurality of mobile devices at the event which is smaller than an overall number of mobile devices at the event;
providing at least one emitting station which transmits at least one emitting station wireless network signal over the range of area identified with a network identifier, said network signal functionality being limited to transmitting the network identifier and said network signal not allowing mobile devices to connect to the emitting station wireless network signal;
providing a wireless network access device that has a capacity to establish connections with a limited number of concurrent connections between mobile devices and a network;
providing a controlling station that is capable of instructing the emitting station to transmit an encoded network identifier;
the controlling station instructing the emitting station to transmit encoded emitting station network identifiers encoded with the family identifier, instructing the mobile devices assigned to the family identifier to connect to the wireless network access device;
the mobile devices assigned to the family identifier detecting the encoded emitting station network identifier, but not establishing a connection to the emitting station network signal, when the mobile devices are located in the range of the emitting stations;
said application loaded on the mobile devices assigned to the family identifier recognizing the emitting station wireless network signal, decoding the instructions encoded in the emitting station network identifier and executing the instruction to connect to the wireless network access device, execute a data exchange with the wireless access device, and disconnect from the wireless network access device once the data exchange is complete.

12. The method of managing connections between-mobile devices and wireless network access devices of claim 11 wherein the encoded emitting station network identifiers emitted further comprise a set service identifier and a password for the wireless network access device.

13. The method of managing connections between mobile devices and wireless network access devices of claim 11 wherein the application further comprises a preloaded set service identifiers and passwords for the wireless network access devices and the encoded emitting station network identifiers emitted further comprise an instruction to identify the appropriate service identifier and password the wireless network access device from the preloaded set service identifiers and the passwords in the application.

14. A method of managing connections between an individual mobile device and wireless network access devices comprising:
providing a software application to be uploaded to the individual mobile device of an attendee at an event prior to the event, said software application assigned a connection identifier and configured to execute specific instructions when the device detects a wireless network identifier;
erecting a plurality of emitting stations at the event and transmitting the wireless network identifier;
erecting a plurality of wireless network access devices at the event;
configuring the wireless network identifier so that attendee mobile device can only detect network identifier transmitted from the emitting stations and cannot establish a connection to the emitting stations;
using a controlling station to create wireless network identifiers to be transmitted by the emitting stations that instruct mobile devices with the connection identifier to connect to the wireless network access device;
during the event, the emitting stations transmitting a first network identifier from the emitting stations configured with a first connection identifier for the software application installed on the mobile devices to detect and compare with the identifier assigned to the application;
the individual mobile device only executing the instruction to connect to the wireless network access device if the first connection identifier matches the identifier assigned to the application;
during the event, using the controlling station to change the first network identifier to a second network identifier from the emitting stations, where the second network identifier is configured with a second connection identifier and only mobile devices configured with a matching identifier assigned to the application execute the instruction to connect to the wireless network access device.

15. The method of managing connections between an individual mobile device and wireless network access devices of claim 14 wherein the controlling station further maintains a list of mobile devices that want to connect to the wireless network access device and instructs the emitting stations to transmit network identifiers correlated to the list of mobile devices and removes individual mobile devices from the list once the individual mobile device has connected to the wireless network access device.

16. The method of managing connections between an individual mobile device and wireless network access devices of claim 14 wherein the identifier assigned to the software application is a family identifier which is assigned to the individual mobile device.

17. The method of managing connections between an individual mobile device and wireless network access devices of claim 14 further comprising:

erecting a plurality of detecting stations at the event venue;

the individual mobile device emitting a unique wireless network signal encoded with the mobile device network identifier and an instruction that the mobile device wishes to establish the connection with the wireless network access device;

the detecting stations detecting the unique wireless network signal encoded with the mobile device network identifier and the instruction that the mobile device wishes to establish a connection with the wireless network access device and relaying the mobile device identifiers to the controlling station;

the controlling station adding the individual mobile device to the list of mobile devices that want to connect to the wireless network access device.

18. The method of managing connections between an individual mobile device and wireless network access devices of claim 14 further comprising:

erecting a data entry station where the attendee manually enters an individual mobile device network identifier into the data entry station when attendees wish to establish the connection with the wireless network access device;

the data entry station relaying the individual mobile device identifier to the controlling station;

the controlling station adding the individual mobile device to the list of mobile devices that want to connect to the wireless network access device.

* * * * *